April 22, 1924.
A. E. COOK ET AL
1,491,081
TRUCK LOAD INDICATING DEVICE
Filed Nov. 10, 1919
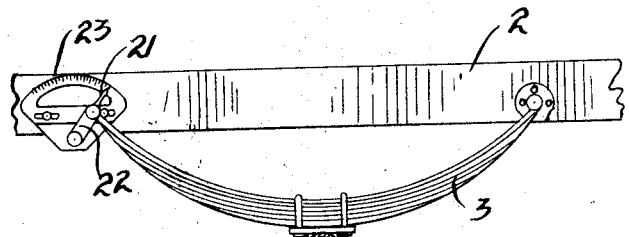
Witnesses
J. L. Ingram
Charles W. Hills Jr.
by
Inventor
Albert Eugene Cook
Thomas VanTuyl
Charles W. Hills Atty Patented Apr. 22, 1924.

1,491,081

UNITED STATES PATENT OFFICE.

ALBERT EUGENE COOK, OF EVANSTON, AND THOMAS VAN TUYL, OF KANKAKEE, ILLINOIS; SAID VAN TUYL ASSIGNOR TO SAID COOK.

TRUCK-LOAD-INDICATING DEVICE.

Application filed November 10, 1919. Serial No. 336,809.

*To all whom it may concern:*

Be it known that we, ALBERT E. COOK and THOMAS VAN TUYL, citizens of the United States, and residents of the city of Evanston, in the county of Cook and State of Illinois, and the city of Kankakee, in the county of Kankakee and State of Illinois, respectively, have invented certain new and useful Improvements in a Truck-Load-Indicating Device; and we do hereby declare that the following is a full, clear, and exact description of the same, reference being had to the accompanying drawings, and to the numerals of reference marked thereon, which form a part of this specification.

This invention relates more particularly to a load indicating device adapted to be used on motor trucks or other vehicles and connected with the springs thereof to register the load being carried by the truck or vehicle.

It is an object of this invention to provide a vehicle with an adjustable means for indicating at all times the load being carried by the vehicle.

It is also an object of the invention to provide a load carrying vehicle with a load scale over which an indicator, actuable by the vehicle springs is adapted to indicate on said scale the load carried by said vehicle.

It is an important object of this invention to provide a vehicle load indicator of simple and effective construction, and adapted to prevent over-loading of trucks, and other vehicles.

Other and further important objects of this invention will be apparent from the disclosures in the drawings and specification.

The invention (in a preferred form) is illustrated in the drawings and hereinafter more fully described.

On the drawings:

Fig. 1 is a side elevation of a vehicle chassis sill and spring equipped with a load indicator embodying the principles of this invention.

As shown on the drawings:

The reference numeral 2 indicates a motor truck chassis sill, to which one end of a spring 3 is connected. An indicator or pointer 21 is secured to or formed on a spring link or toggle 22, which supports the other end of the spring 3. Secured on the chassis sill 2 in back of the link 22 is an adjustable scale plate 23 having a curved or arc shaped portion provided with load graduations. Deflections of the automobile truck spring 3, due to loads carried by the truck, cause movement of the pointer 21 over the graduated portion of the scale 23. As illustrated, the scale plate 23 is adapted to be adjusted on the chassis sill 2 to compensate for any variations in the spring 3 after the same has been subjected to considerable use.

It will, of course, be understood that indicating devices similar to that hereinbefore described may be mounted on both sides of the vehicle, or in any other desired location on a vehicle, for the purpose of indicating the loads carried.

We are aware that numerous details of construction may be varied through a wide range without departing from the principles of this invention, and we therefore do not purpose limiting the patent granted otherwise than necessitated by the prior art.

We claim as our invention:—

1. The combination with an automobile chassis sill and spring, of an indicating scale secured to the chassis sill, and an indicator pivotally connected to said scale and to said spring adapted to be actuated over said scale to indicate the load carried by the automobile.

2. The combination with an automobile chassis sill and spring, of an indicating scale adjustably secured on the chassis sill, a link pivotally connected to said scale and to one end of said spring, and an indicator secured on said link adapted to indicate on said scale the load carried by the automobile.

3. The combination with a vehicle and a spring thereof, of graduated means mounted on said vehicle, and an indicator pivotally supporting one end of the spring and adapted to be actuated thereby to indicate on said graduated means the load carried by the vehicle.

4. The combination with an automobile spring, of a load indicator pivoted on the automobile and pivotally connected to one end of the spring.

In testimony whereof we have hereunto subscribed our names in the presence of two subscribing witnesses.

ALBERT EUGENE COOK.
THOMAS VAN TUYL.

Witnesses:
EARL M. HARDINE,
CHARLES W. HILLS, Jr.